US006415266B1

(12) United States Patent
Do

(10) Patent No.: US 6,415,266 B1
(45) Date of Patent: Jul. 2, 2002

(54) DYNAMIC INSTRUCTION SYSTEM FOR INPUT OF PARTS IN VEHICLE PRODUCTION LINE

(75) Inventor: Sung-Sup Do, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/472,443

(22) Filed: Dec. 27, 1999

(30) Foreign Application Priority Data

May 26, 1999 (KR) ............................................ 99-18975

(51) Int. Cl.⁷ .............................................. G06F 17/60
(52) U.S. Cl. ........................... 705/28; 700/115; 700/214
(58) Field of Search ............................. 705/22, 28, 29; 700/115, 116, 214–216, 225, 226; 29/711

(56) References Cited

U.S. PATENT DOCUMENTS

| | | | | |
|---|---|---|---|---|
| 4,669,047 A | * | 5/1987 | Chucta ........................ | 700/113 |
| 5,204,821 A | * | 4/1993 | Inui et al. ...................... | 705/29 |
| 5,699,259 A | * | 12/1997 | Colman et al. ............... | 705/28 |
| 5,953,234 A | * | 9/1999 | Singer et al. ............... | 700/214 |

FOREIGN PATENT DOCUMENTS

JP 06320400 * 11/1994 .................. 29/711

OTHER PUBLICATIONS

*Industrial Robot* jounral article "Robots carry the load at Scania" (v22n4, pp36–38), dated 1995.*

* cited by examiner

*Primary Examiner*—Dean J. Kramer
(74) *Attorney, Agent, or Firm*—Birch, Stewart, Kolasch & Birch, LLP

(57) ABSTRACT

Disclosed is a dynamic instruction system for the input of parts in a vehicle production line. The dynamic instruction system includes a materials host for providing material type information, warehouse parts information, and parts information; a management server for managing dynamic parts input instructions and process/storage stocks based on the parts information provided by the materials host; a management system for managing dynamic parts input instructions information and process/storage stock on-line adjustment instructions, compiling and managing vehicle type information, and managing results, press conditions, and vehicle body storage conditions; and a vehicle-mounted wireless terminal for reporting to the management server and the management system the completion of parts input, and which exchanges information on process/storage stock adjustments and present stock conditions with the management server and the management system.

6 Claims, 10 Drawing Sheets

DYNAMIC INSTRUCTION SYSTEM FOR INPUT OF PARTS IN VEHICLE PRODUCTION LINE

BACKGROUND OF THE INVENTION (a) Field of the Invention

The present invention relates to a dynamic instruction system for the input of parts in a vehicle production line. More particularly, the present invention relates to a dynamic instruction system for the input of parts in a vehicle production line which prevents the presence of defective parts and maintains optimum stock levels in both the production line and a parts storage area such that capacity utilization and overall productivity are enhanced.

(b) Description of the Related Art

Resulting from more demanding consumer tastes and easier access to markets around the world, manufacturing companies have been forced to configure their production systems to handle the manufacture of a variety of product types in increasingly smaller batches. This often leads to insufficient space in which to store or load parts since each process in the production line requires a significant number of parts.

With regard to the conventional vehicle production line, the input of parts is carried out by a person in charge of this process. That is, a worker visually determines which and how many parts are needed at specific processes in the production line, then performs control to deliver and input the parts at the necessary process. This frequently results in parts input errors and delays. Accordingly, parts stock levels are often too high or too low, defective parts come to be present in the production line or a defective end product is manufactured, and capacity utilization and productivity suffer.

SUMMARY OF THE INVENTION

The present invention has been made in an effort to solve the above problems.

It is an object of the present invention to provide a dynamic instruction system for the input of parts in a vehicle production line which, based on vehicle type information at each process as well as dynamic production plans, performs computations on a variety of data in order to provide parts input information to both equipment in the production line and to workers such that parts can be provided as they are needed, thereby preventing the presence of defective parts at processes in the production line and in a parts storage area, and realizing optimum stock levels in the same such that capacity utilization and productivity are enhanced.

To achieve the above object, the present invention provides a dynamic instruction system for the input of parts in a vehicle production line. The dynamic instruction system comprises a materials host for providing material type information, warehouse parts information, and parts information; a management server for managing dynamic parts input instructions and process/storage stocks based on the parts information provided by the materials host; a management system for managing dynamic parts input instructions information and process/storage stock on-line adjustment instructions, compiling and managing vehicle type information, and managing results, press conditions, and vehicle body storage conditions; and a vehicle-mounted wireless terminal for reporting to the management server and the management system the completion of parts input, and which exchanges information on process/storage stock adjustments and present stock conditions with the management server and the management system.

According to a feature of the present invention, the management server comprises a parts input instruction server which, according to the information supplied from the materials host, provides dynamic parts input instructions, and performs process/storage stock management, defective parts information management, and past information data management; and an AS/RS,PNL storage management server for performing pallet information management for pressed parts.

According to another feature of the present invention, the management system comprises a production instruction system for providing real-time dynamic production planning data and vehicle type information processed at each process; a storage management system for managing AS/RS delivery instructions as well as stock and PNL general storage information; and a management computer for managing results information, press information, and vehicle body storage information.

According to yet another feature of the present invention, the production instruction system of the management system comprises a monitor for displaying urgent parts requests and operation conditions; a factory automation controller for controlling the urgent parts requests and the operation conditions; and a programmable logic controller for controlling an operation condition sequence and production line capacity conditions.

According to still yet another feature of the present invention, the storage management system of the management system comprises an AS/RS emergency delivery computer; a PNL general storage computer; a terminal server; a stacker/crane controller; and an AS/RS condition display.

According to still yet another feature of the present invention, the management computer of the management system comprises a results management computer for managing an operation condition sequence and production line capacity conditions; a vehicle body condition management computer for outputting a general information input/ adjustment condition and past communication reports; and a press condition management computer.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
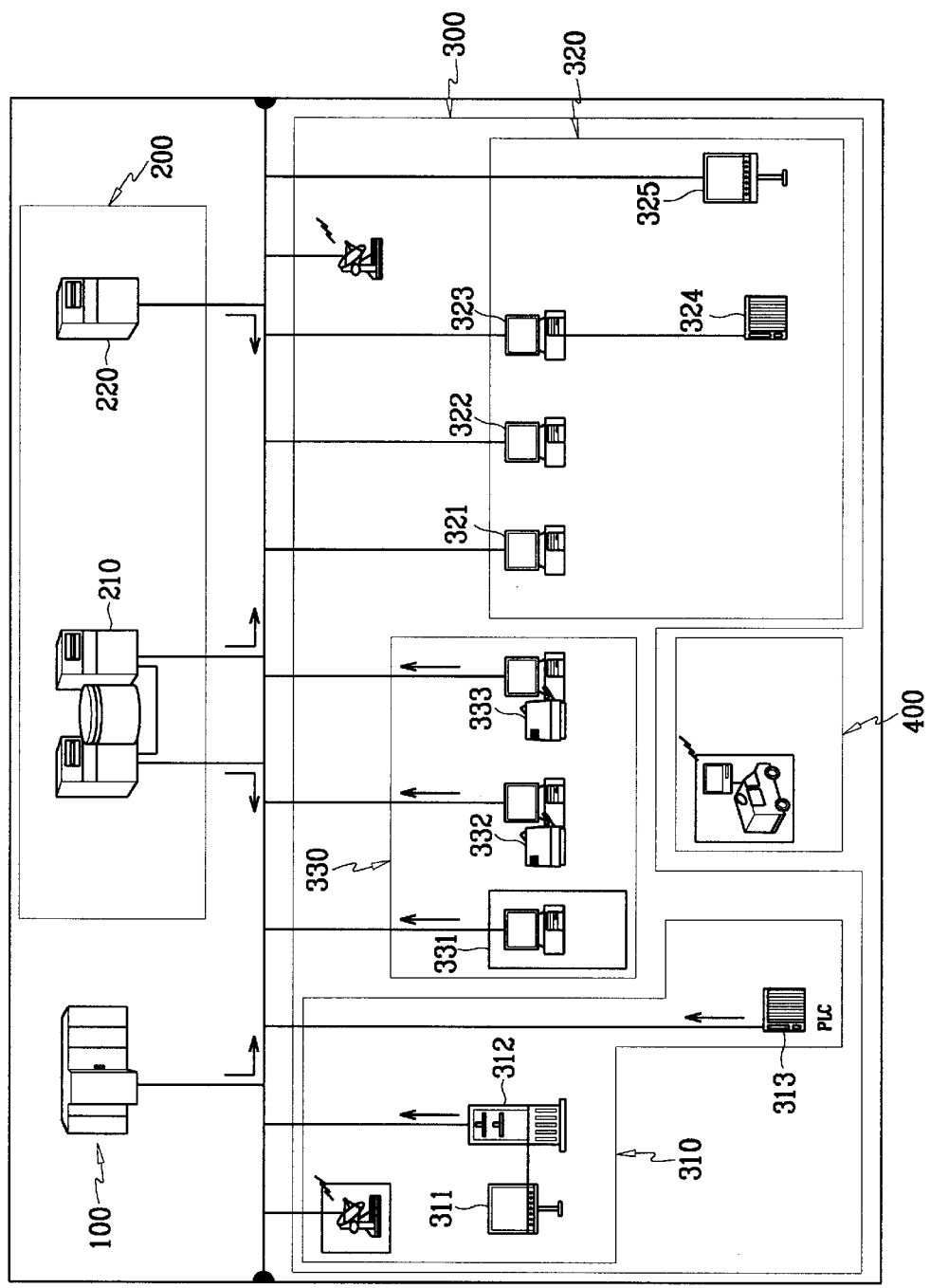
FIG. 1 is a block diagram of a dynamic parts input instruction system according to a preferred embodiment of the present invention.

FIG. 1 is a block diagram of a dynamic parts input instruction system according to a preferred embodiment of the present invention.

The input instruction system comprises a materials host 100 for providing material type information, warehouse parts information, and parts information; a management server 200 for managing dynamic parts input instructions and process/storage stocks based on the parts information provided by the materials host 100; a management system 300 for managing dynamic parts input instructions information and process/storage stock on-line adjustment instructions, compiling and managing vehicle type information, and managing results, press conditions, and vehicle body storage conditions; and a vehicle-mounted wireless terminal 400 for reporting to the management server 200 and the management system 300 the completion of parts input, and which exchanges information on process/storage stock adjustments and present stock conditions with the management server 200 and the management system 300. The management server 200 includes a parts input instruction server 210 which, according to the information supplied from the materials host 100, provides dynamic parts input instructions, and performs process/storage stock management, defective parts information management, and past information data management; and an AS/RS,PNL storage management server 220 for performing pallet information management for pressed parts.

The management system 300 includes a production instruction system 310 for providing real-time dynamic production planning data and vehicle type information processed at each process; a storage management system 320 for managing AS/RS delivery instructions as well as stock and PNL general storage information; and a management computer 330 for managing results information, press information, and vehicle body storage information.

The production instruction system 310 of the management system 300 includes a monitor 311 for displaying urgent parts requests and operation conditions; a factory automation controller (FA/C) 312 for controlling the urgent parts requests and the operation conditions; and a programmable logic controller (PLC) 313 for controlling an operation condition sequence and production line capacity conditions.

The storage management system 320 of the management system 300 includes an AS/RS emergency delivery computer 321, a PNL general storage computer 322, a terminal server 323, a stacker/crane controller 324, and an AS/RS condition display 325.

The management computer 330 of the management system 300 includes a results management computer 331 for managing an operation condition sequence and production line capacity conditions, a vehicle body condition management computer 332 for outputting a general information input/adjustment condition and past communication reports, and a press condition management computer 333.

Figure 2:
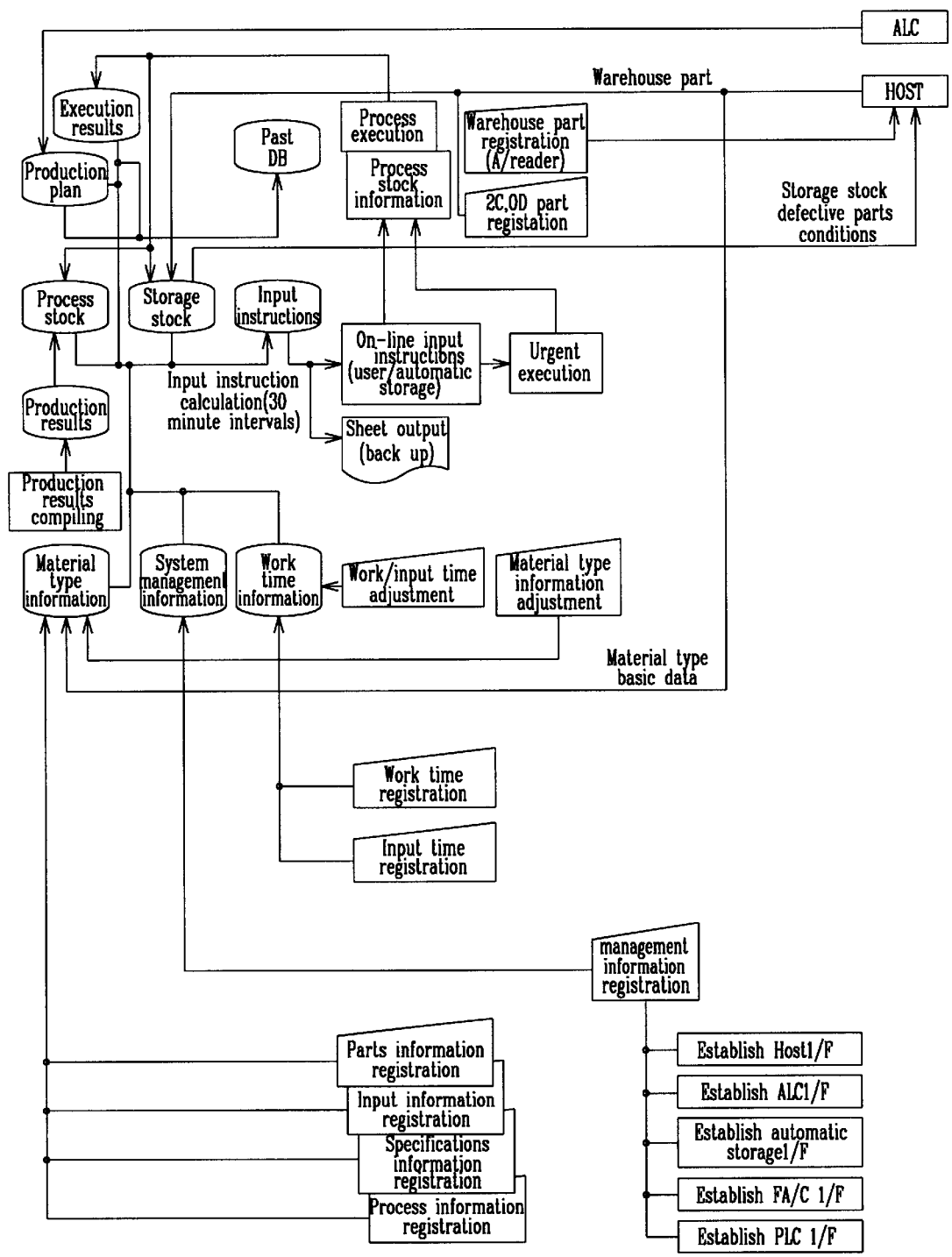
FIG. 2 is a chart showing an operational flow of the dynamic instruction system shown in FIG. 1.

FIG. 2 is a chart showing an operational flow of the dynamic instruction system shown in FIG. 1.

The materials host 100 receives warehouse product registrations from a warehouse product registration leader and receives defective part condition information from a storage file. Further, a material type information file receives material type basic data from the materials host 100 such that parts information, input information, specifications information, and process information are registered in the vehicle body condition management computer 332 and the press condition management computer 333, and so that material type information is adjusted.

Management information is registered in a system management information file via the vehicle body condition management computer 332. In particular, the management information that is registered in the system management information file is related to the establishment of a host interface, a computation control interface, an automatic storage interface, a factory automation control interface, and a programmable logic control interface.

A work time and input time are registered in a work time information file through the vehicle body condition management computer 332. Also, the work time and input time are adjusted in the work time information file.

In a process stock file, production results are compiled, and adjustments are made in process stock and in the carrying out of processes.

Production plan information from the factory automation controller 312 is stored in a production plan file.

Job completion process data is stored in a past database file.

Process execution data and process stock adjustment data are stored in an execution result file.

Stored in a storage file are warehouse parts data received from the materials host 100, and process execution data and process stock adjustment data received from the parts input instruction server 210.

An input instruction file receives input instruction computation data from the process stock file, material type information file, system management file, work time information file, execution result file, and storage file such that input instruction data is output therefrom, and also outputs on-line input instruction emergency execution data to the worker in charge and to an automatic storage.

In the dynamic parts input instruction system of the present invention described above, if a production plan is established, a daily input plan is computed to establish a daily input plan. In such a daily input plan, specific times during a particular day in which the parts and quantity of each part to be input are calculated. The daily input plan is established two hours before the start of production, and is based on information of the work performed at each process in the production line at the end of the previous day's production.

Figure 3:
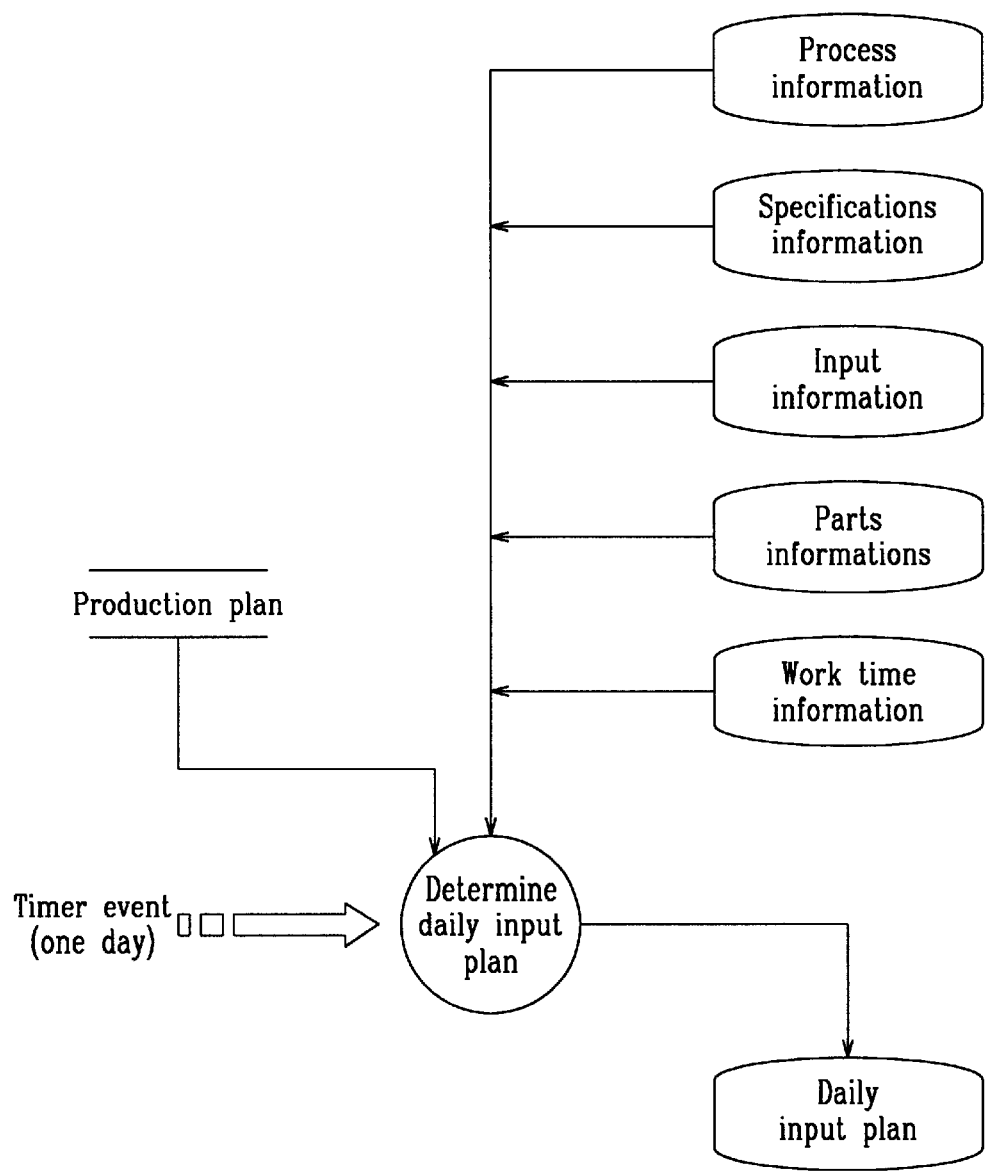
FIG. 3 is a chart showing a process by which the dynamic instruction system of FIG. 1 generates a daily production plan.

Accordingly, the determination of parts input, with reference to FIG. 3, is done by comparing corresponding information with input information, and if they correspond, calculating then establishing a daily production plan by which parts are input into the production line.

Figure 4:
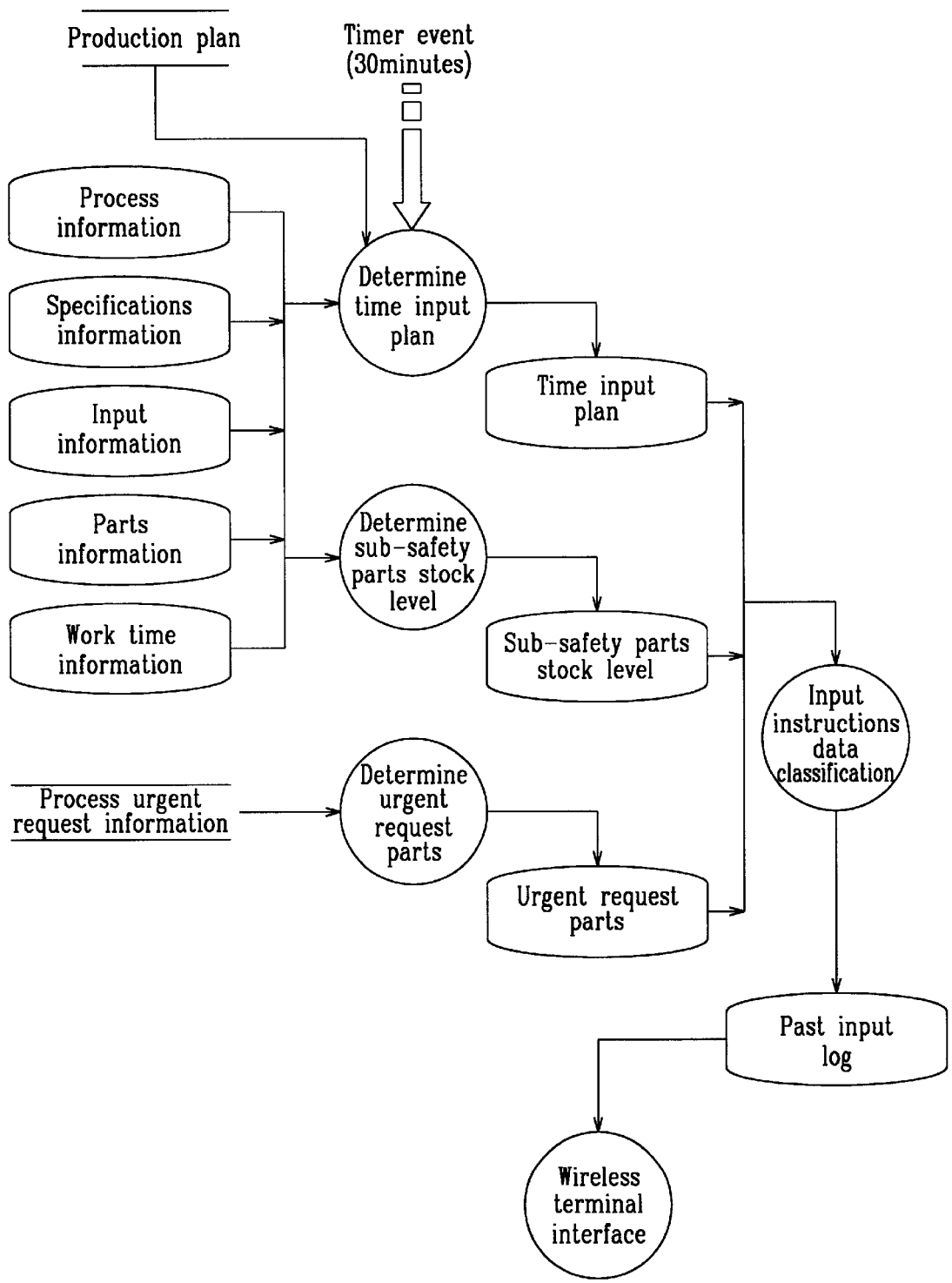
FIG. 4 is a chart showing a process by which the dynamic instruction system of FIG. 1 generates a time interval production plan.

After the daily production plan is established, a time interval production plan is made. That is, with reference to FIG. 4, a production plan is calculated every 30-minute interval in which parts to be input are determined. At this time, work start information at each process is determined using input timing and UPH based on final results information at each process. A part for which a prior instruction has been given is excluded as an input candidate, thereby preventing the occurrence of redundant instructions.

The determination of input parts is done by comparing, in the parts input instruction server 210, corresponding information specifications with input information specifications, and if they correspond inputting the part. At this time, if the part was input previously, the part is not input.

Also, if the number of parts input is greater than a number of parts input at one time, recordation of a corresponding part(s) is added such that the number of parts input does not surpass the number of parts input at one time.

Subsequently, it is determined if the stock of parts has fallen below a safety stock level. This is performed by comparing a process stock, after the same is adjusted, with a safety stock level. If it is determined that the stock of parts is below the safety stock level, a parts sub-stock level file is created and transmitted to the vehicle body condition management computer 332 and the press condition management computer 333, and control is performed so that a worker is notified.

The worker performs determination of whether an urgent parts request is made. That is, the worker checks the monitor 311 to see if an urgent parts request has been made at one of the processes. If it is determined that there has been an urgent parts request, the worker generates urgent parts request data and classifies input instruction data, after which the worker registers past input then notifies another worker at the corresponding area using a wireless terminal interface.

Figure 5:
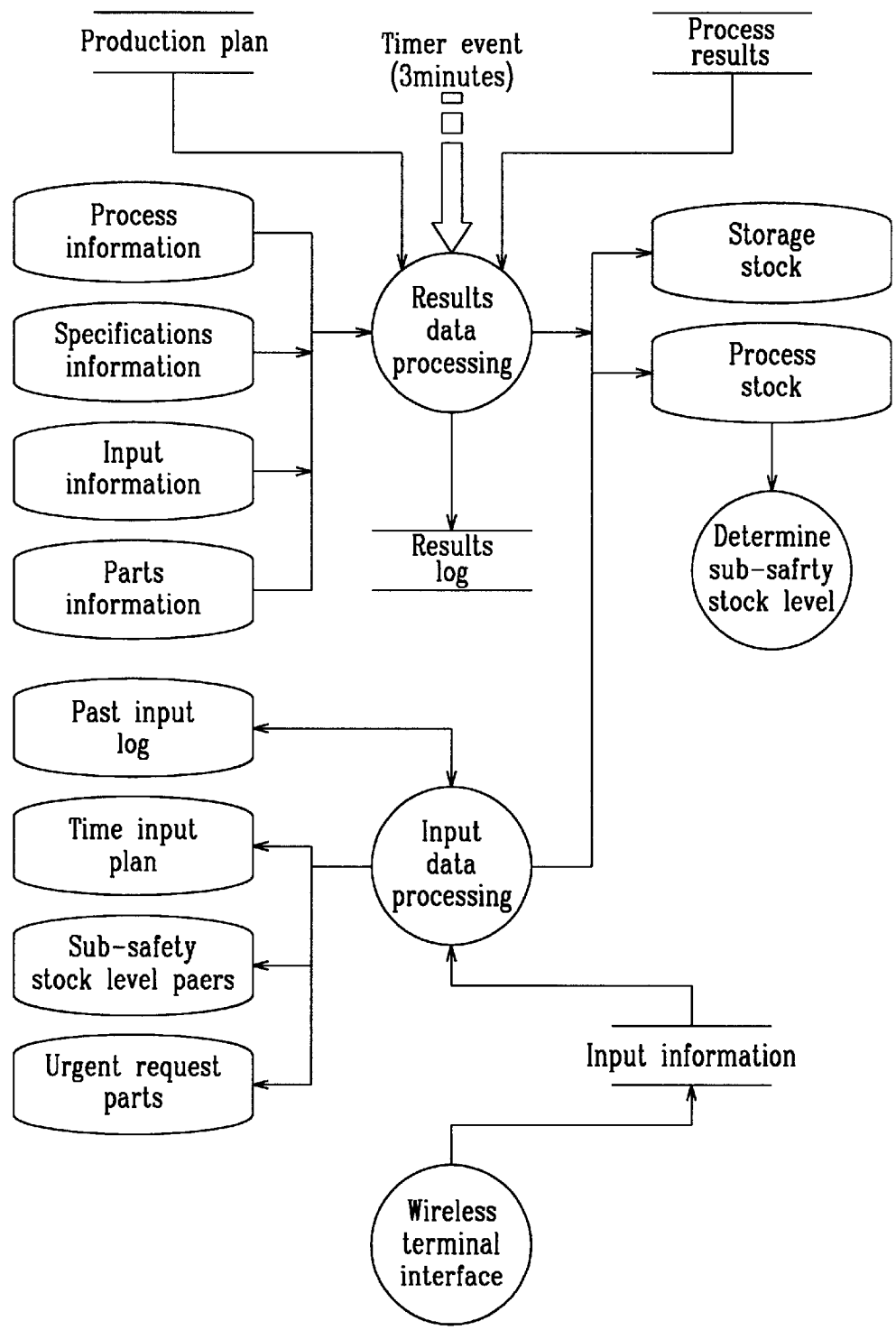
FIG. 5 is a chart showing a process by which data is processed in the dynamic instruction system of FIG. 1.

Results data processing, with reference to FIG. 5, is done by determining whether production results are present at each process from the factory automation controller 312 such that the parts input to achieve results at corresponding processes can be obtained.

If a process stock of a specific part in a particular process is removed, this fact is written in a results registration file. The results data is used when determining daily results and when performing optimization inspections.

If parts input completion information arrives from the wireless terminal 400, an input data processing step is performed to make adjustments in process stocks at each of the processes and stocks in storage, and this information is input into a corresponding record program of a past input register.

Figure 6:
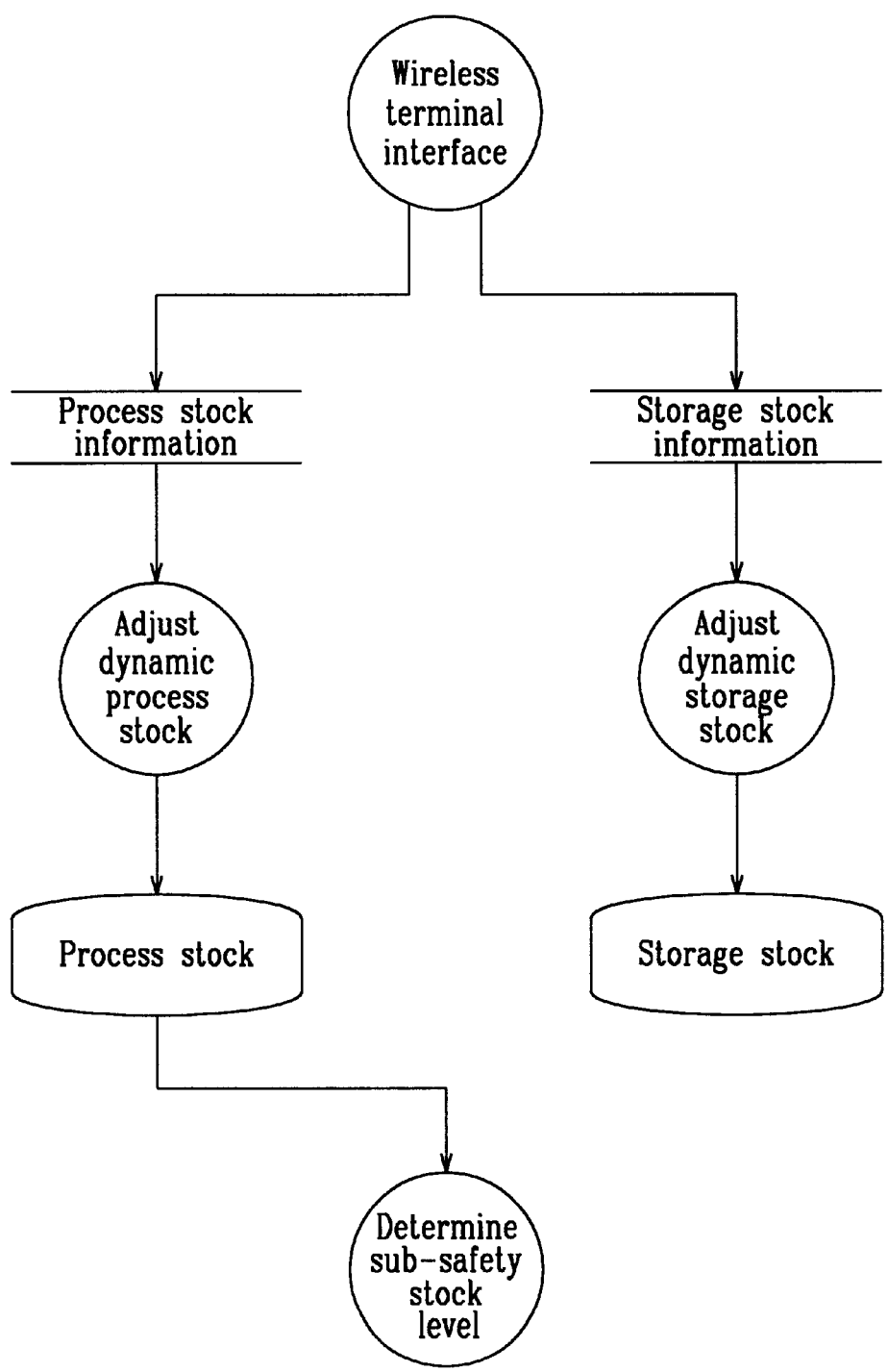
FIG. 6 is a chart showing a process by which the dynamic instruction system of FIG. 1 adjusts stock in a process area and a storage area.

The wireless terminal interface, with reference to FIG. 6, makes adjustments in parts storage and process stocks if process stock or storage stock adjustment information is received from process stock information and process stock information via the wireless terminal 400. At this time, after making adjustments to process stocks, a sub-safety stock calculation processor is operated.

Figure 7:
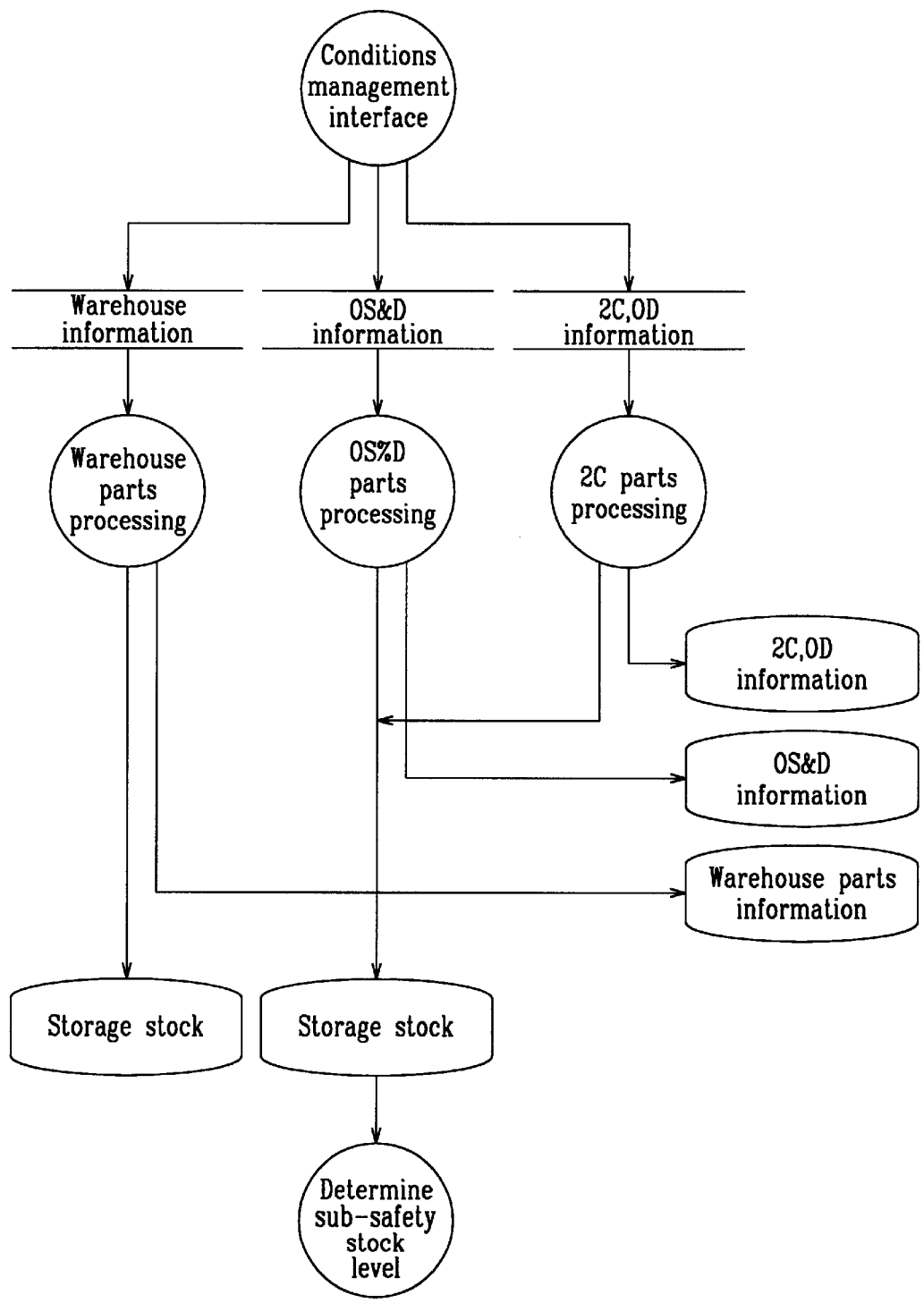
FIG. 7 is a chart showing a process by which the dynamic instruction system of FIG. 1 performs warehousing and processing of parts.

A conditions management interface, with reference to FIG. 7, is performed such that if warehouse parts processing, OS&D information processing, and 2C,OD parts processing is input via warehouse information, OS&D information, and 2C,OD parts registration information, a corresponding parts process stock file is adjusted in a host or a client, and recordal additions are made in an OS&D and 2C,OD parts registration table. At this time, additions, deletions and adjustments can be made to the OS&D and 2C,OD parts registration, and such processing is performed by using reference numerals in the number of parts.

In the host or client, if warehouse parts processing is input via warehouse parts registration information, a corresponding parts storage stock file is adjusted and recordal additions are made in a warehouse parts registration table.

Figure 8:
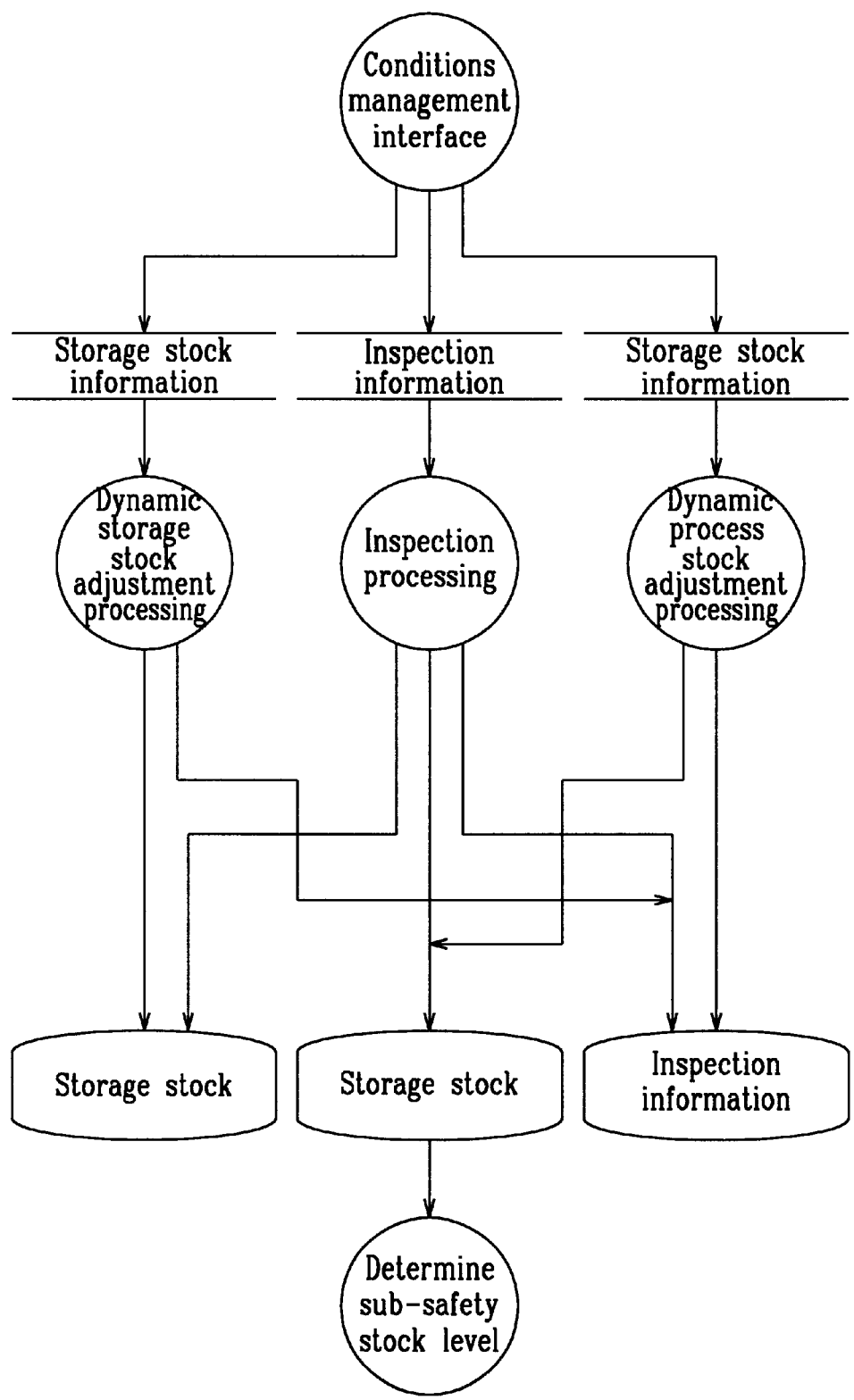
FIG. 8 is a chart showing a process by which the dynamic instruction system of FIG. 1 performs dynamic adjustments to a stock, inspections, and adjustments to stocks at processes.

Referring now to FIG. 8, if storage stock adjustment data arrives directly from a client, corresponding parts storage stock is adjusted.

Also, if process stock adjustment data arrives directly from a client, corresponding parts process stock is adjusted.

If seat parts results information arrives from a client, results processing is performed such that process stocks are adjusted. At this time, results quantity is added to by as much as input after a results time received from a client, and results quantity is subtracted from by as much as a results quantity after the results time is received, thereby calculating a present stock quantity. This is used to adjust process stocks and to determine a sub-safety stock level.

Figure 9:
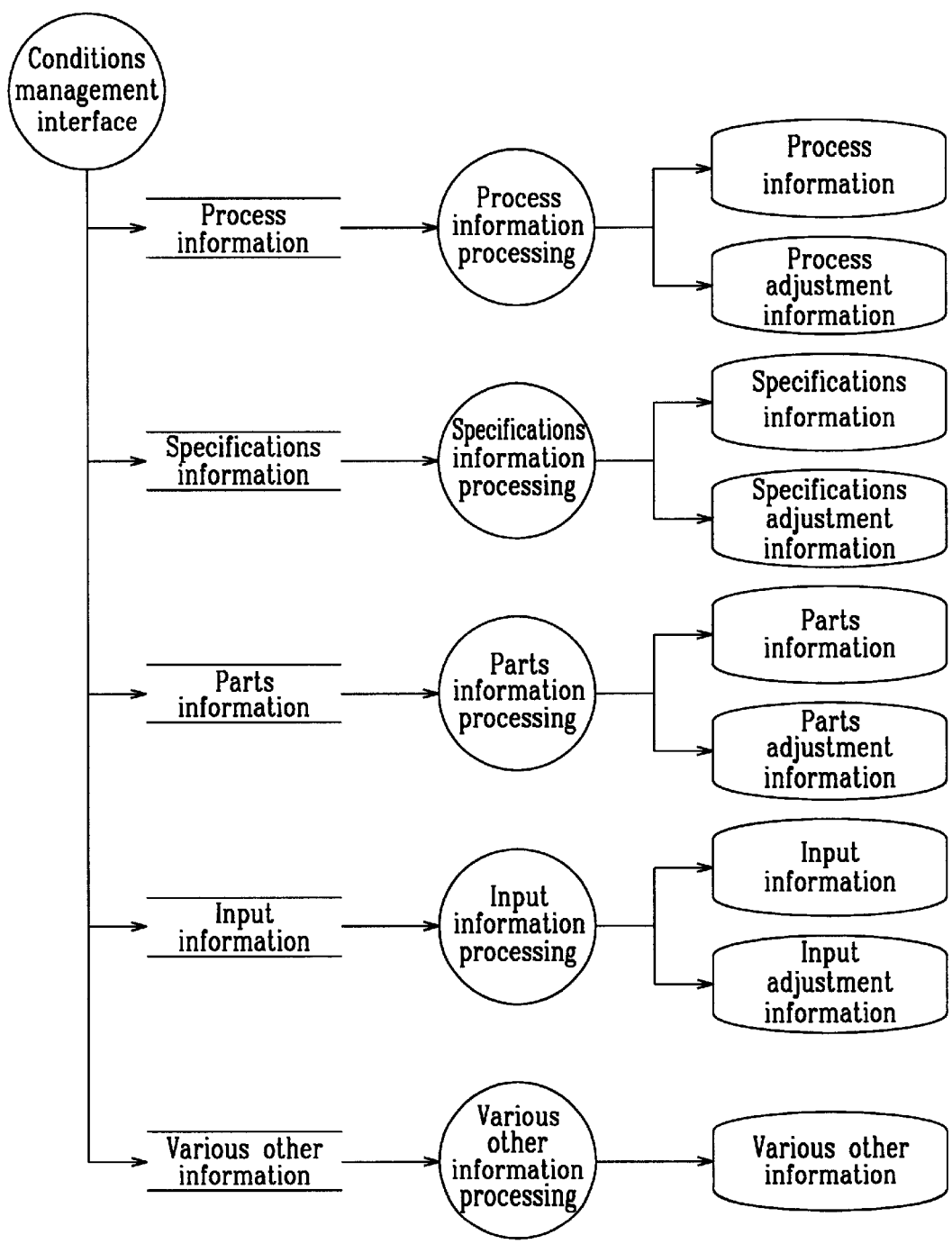
FIG. 9 is a chart showing a process by which the dynamic instruction system of FIG. 1 processes adjustment information.

Further, in the conditions management interface, with reference to FIG. 9, if process adjustment information, specifications adjustment information, parts adjustment information, input adjustment information, and other various adjustment information is received from a client, additions, deletions, and adjustments are made in tables corresponding to each processor. At this time, information having an application point is first stored in a temporary table.

Figure 10:
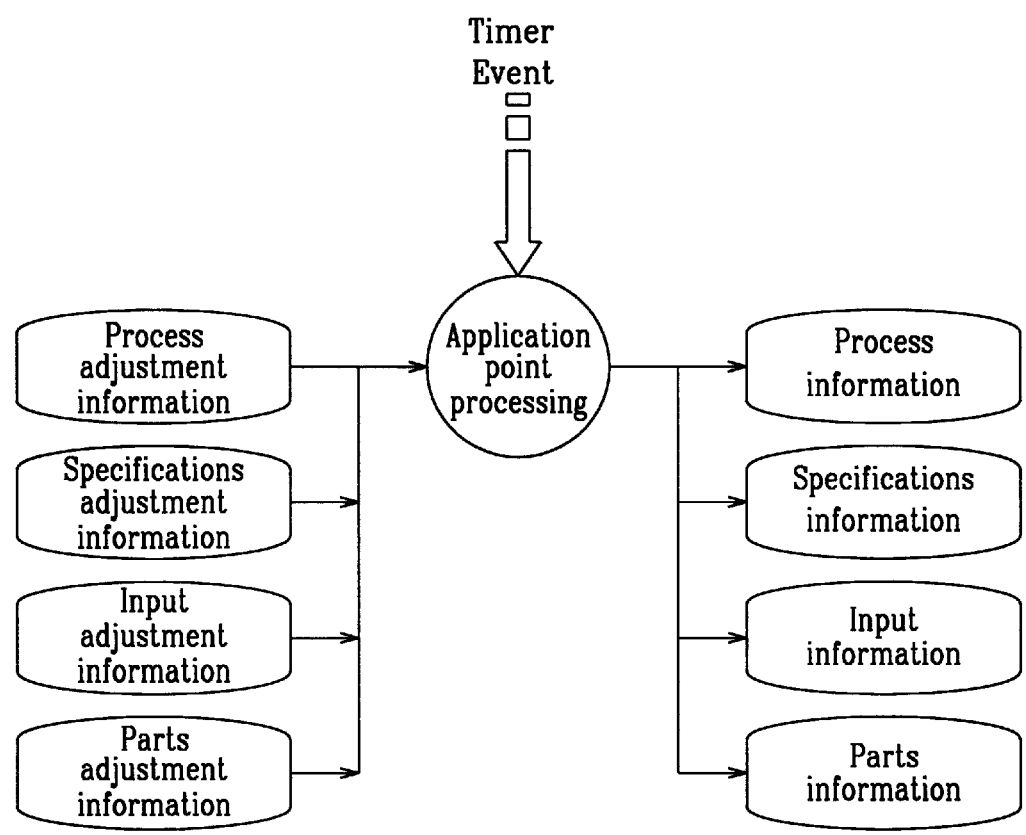
FIG. 10 is a chart showing a process by which the dynamic instruction system of FIG. 1 checks, adds and deletes data.

With regard to the information having an application point, referring to FIG. 10, the information is periodically checked, and at predetermined time intervals is added, deleted, or adjusted in the corresponding table.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A dynamic instruction system for the input of parts in a vehicle production line comprising:

a materials host for providing material type information, warehouse parts information, and parts information;

a management server for managing dynamic parts input instructions and process/storage stocks based on the parts information provided by the materials host;

a management system for managing dynamic parts input instructions information and process/storage stock on-line adjustment instructions, compiling and managing vehicle type information, and managing results, press conditions, of press machines holding the parts and vehicle body storage conditions; and a vehicle-mounted wireless terminal mounted on said vehicle for reporting to the management server and the management system the completion of parts input to the vehicle, and which exchanges information on process/storage stock adjustments and present stock conditions with the management server and the management system.

2. The dynamic instruction system of claim 1 wherein the management server comprises:

a parts input instruction server which, according to the information supplied from the materials host, provides dynamic parts input instructions, and performs process/storage stock management, defective parts information management, and past information data management; and an automated storage management server for performing pallet information management for certain parts.

3. The dynamic instruction system of claim 1 wherein the management system comprises:
- a production instruction system for providing in real-time dynamic production planning data and vehicle type information processed at each process;
- a storage management system for managing automated storage and retrieval system delivery instructions, and stock and panel general storage information; and
- a management computer for managing results information, press information from the press machines, and vehicle body storage information.

4. The dynamic instruction system of claim 3 wherein the production instruction system of the management system comprises:
- a monitor for displaying urgent parts requests and operation conditions;
- a factory automation controller for controlling the urgent parts requests and the operation conditions; and
- a programmable logic controller for controlling an operation condition sequence and production line capacity conditions.

5. The dynamic instruction system of claim 3 wherein the storage management system of the management system comprises:
- an automated storage and retrieval system emergency delivery computer;
- a panel general storage computer;
- a terminal server;
- a stacker/crane controller for stacking the parts; and
- an automated storage and retrieval system condition display.

6. The dynamic instruction system of claim 3 wherein the management computer of the management system comprises:
- a results management computer for managing an operation condition sequence and production line capacity conditions;
- a vehicle body condition management computer for outputting a general information input/adjustment condition and past communication reports; and
- a press condition management computer for the press machines.

* * * * *